Jan. 23, 1968   M. L. BENJAMIN ET AL   3,365,204
COLLET CHUCK

Filed April 6, 1965   3 Sheets-Sheet 1

INVENTORS.
MILTON L. BENJAMIN
DAVID D. WALKER
BY
Oberlin, Maky & Donnelly
ATTORNEYS Jan. 23, 1968 M. L. BENJAMIN ET AL 3,365,204
COLLET CHUCK
Filed April 6, 1965 3 Sheets-Sheet 2

INVENTORS.
MILTON L. BENJAMIN
DAVID D. WALKER
BY
Oberlin, Maky & Donnelly
ATTORNEYS Jan. 23, 1968

M. L. BENJAMIN ET AL 3,365,204

COLLET CHUCK

Filed April 6, 1965

INVENTORS.
MILTON L. BENJAMIN
DAVID D. WALKER
BY

Oberlin, Maky & Donnelly
ATTORNEYS

United States Patent Office 3,365,204
Patented Jan. 23, 1968

3,365,204
COLLET CHUCK
Milton L. Benjamin, Shaker Heights, and David D. Walker, Chagrin Falls, Ohio, assignors to Erickson Tool Company, Solon, Ohio, a corporation of Ohio
Filed Apr. 6, 1965, Ser. No. 445,916
10 Claims. (Cl. 279—51)

ABSTRACT OF THE DISCLOSURE

A chuck having radially opposed grooves in the nosepiece and nose ring which define a raceway that is filled with balls for establishing a rotatable, but axially fixed connection between the nosepiece and nose ring.

Disclosure

The present invention relates generally as indicated to a collet chuck in which a drill, reamer, tap or like tool, or a workpiece is gripped by a contractible collet. More particularly, the present invention relates to improved collet chucks of the types disclosed in the Benjamin Patents 2,228,685, and 3,035,845, dated Jan. 14, 1941, and May 22, 1962, respectively.

One principal object of this invention is to provide a collet chuck having a unique ball bearing connection between a rotatable nosepiece and a nose ring, the latter of which engages the outer end of the contractible collet to urge it into engagement with a cam surface in the chuck body or shank.

It is another object of this invention to provide a simple form of collet chuck in which virtually no turning torque is imposed on the nose ring through the aforesaid ball bearing connection, whereby corresponding twisting strains on the collet are avoided so as to achieve great accuracy, for example, .0003" total indicator reading at a distance of 4" from the end of the chuck, as measured on the shank of a tool or the like gripped in the chuck.

Another object of this invention is to provide a collet chuck which, in relation to the torque applied on the nosepiece, achieves a substantial increase in gripping force applied on the tool shank such increase in gripping force being of the order of 50% greater than obtainable with, for example, a collet chuck of the type disclosed in the Benjamin Patent 3,035,845 which employs a radial needle bearing instead of the novel ball bearing connection herein.

It is another object of this invention to provide in a collet chuck a novel ball bearing arrangement in which complementary raceways in the nosepiece and nose ring respectively, serve not only to transmit axial forces from the nosepiece to the nose ring without turning of the latter, but additionally, the balls thereof constitute keys to retain the nosepiece and nose ring together, thus eliminating need for provision of snap rings or the like. Moreover, the ball bearing connection is such that the raceways and balls therein are protected from damage by dirt and chips and the like when the chuck is in use.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of invention may be employed.

Figure 1:
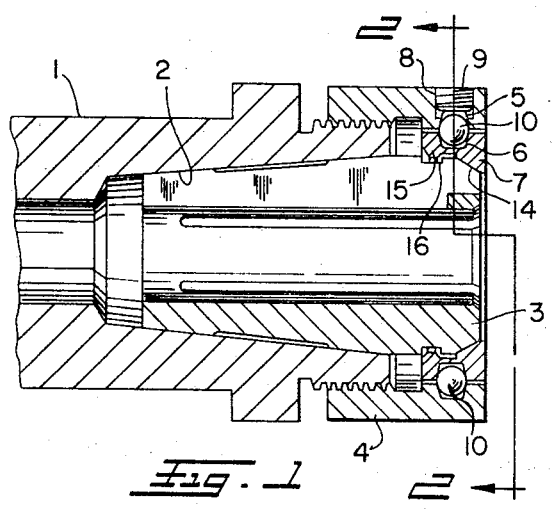
FIG. 1 is a cross-section view taken substantially along the line 1—1, FIG. 2 illustrating one form of collet chuck employing the novel ball bearing connection constituting the present invention, this collet chuck additionally being of the type in which the contractible collet is positively actuated in both directions responsive to rotation of the nosepiece in opposite directions.
Figure 2:
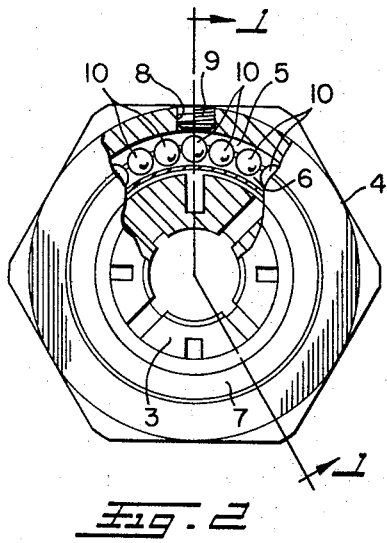
FIG. 2 is a cross-section view taken substantially along the line 2—2, FIG. 1 showing a full complement of balls in the complementary raceways of the nosepiece and nose ring.
Figure 3:
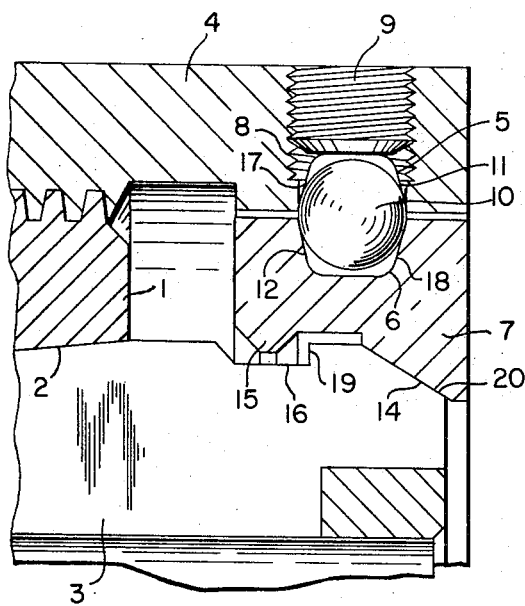
FIG. 3 is a fragmentary radial cross-section view on much enlarged scale illustrating in detail the ball bearing connection between the nosepiece and nose ring.
Figure 6:
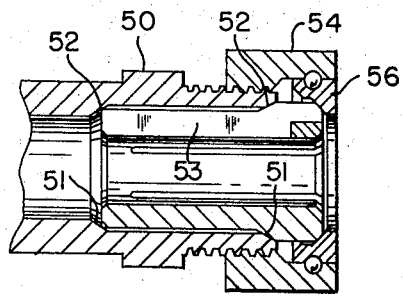
Figure 5:
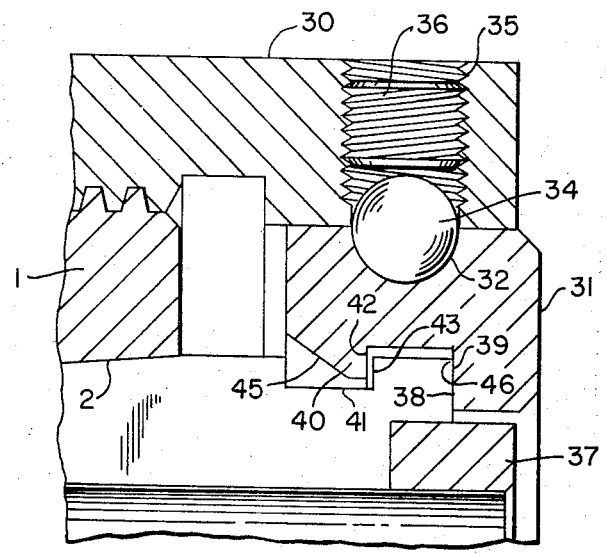
Figure 8:
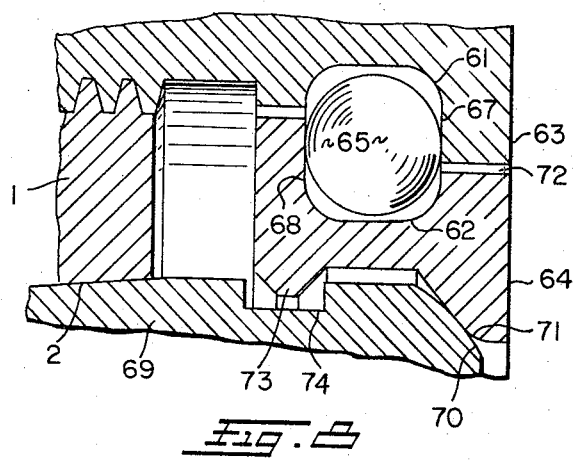
Figure 7:
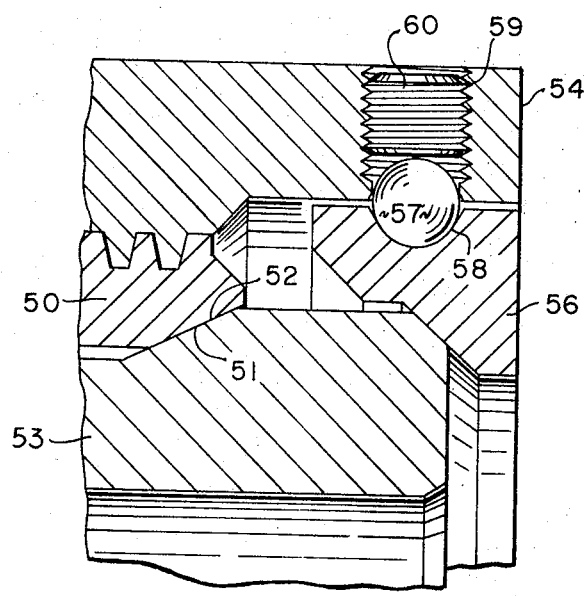

FIG. 5 is yet another enlarged radial fragmentary cross-section view similar to FIG. 3, except illustrating a modification in which the nose ring is a slip fit in the nosepiece, the nosepiece and nose ring having complementary raceways for balls, said nose ring, in addition, having a plane face thereof in engagement with a plane face of the collet so that eccentricity between the nosepiece-nose ring assembly with respect to the collet will not cause the latter to be so eccentrically disposed;

FIG. 6 is a cross-section view similar to FIG. 1, except showing a different form of collet which is of the self-releasing type so as not to require radially overlapping surfaces between the nosepiece assembly and the collet for withdrawing the collet from the chuck body;

FIG. 7 is a much enlarged fragmentary radial cross-section view showing the ball bearing connection employed in the FIG. 6 chuck, the complementary raceways in the nosepiece and nose ring being specially formed to preclude undesirable deformation thereof when axial forces are transmitted through the balls disposed in such raceways; and FIG. 8 is another much enlarged radial cross-section view similar to FIG. 3, except illustrating modifications in the complementary raceways of the nosepiece and nose ring and, additionally, illustrating a modification in the interengaging surfaces of the nose ring and collet.

Referring now in detail to the drawings, the collet chuck illustrated in FIGS. 1 to 4 comprises a chuck body 1 having a tapered bore 2 (e.g. 4 to 10° included angle) in which is received the corresponding tapered contractible collet 3. In the case of chucks for use with, for example, automatic tape controlled machines, it is necessary to grip the shanks of tools with great force and with great accuracy and for such strong grip it has been found that the taper of the bore 2 should be about 4–5°. It has been found that tapers of less than about 4° included angle create such high friction between the bore 2 and the collet 33 that chucks with less taper have lower gripping power.

Screwed onto the chuck body 1 is a nosepiece 4 which has an internal circular groove 5 which faces a corresponding external groove 6 formed in the nose ring 7 disposed within said nosepiece 4. A radial passage 8 in the nosepiece 4 (closed by a self-locking screw plug 9) is employed to introduce a full complement of balls 10 disposed in the annular raceway defined between said grooves 5 and 6. In a chuck having a bearing mean diameter of 1.438" there are twenty-eight 5/32 inch diameter balls 10 in said raceway.

Figure 4:
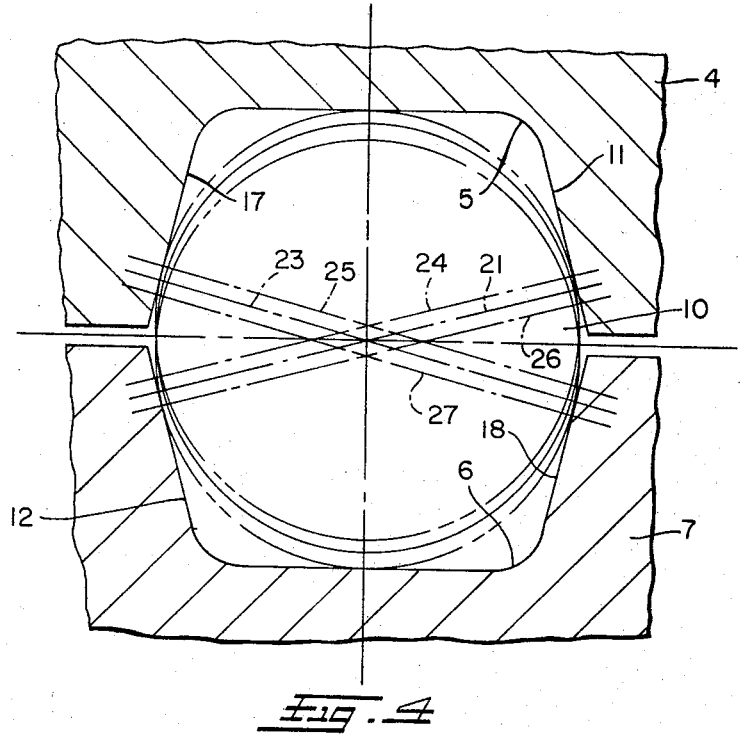
FIG. 4 is yet another enlargement of the ball bearing connection by itself such as employed in FIGS. 1, 2, and 3, wherein the flanks of the raceways are tapered to achieve certain desirable results.

As best shown in FIGS. 3 and 4, the sides of the grooves 5 and 6 are frusto-conical, at an included angle of 29° corresponding to that of an Acme thread to enable use of conventional tooling. When the nosepiece 4 is turned to advance it toward the left, the side 11 of the groove 5 will engage the balls 10 and axial force will be transmitted to the nose ring 7 by the balls engaging the side 12 of the groove 6 of the nose ring 7, whereby the nose ring 7 will correspondingly be advanced to the left but without turning tendency owing to the rolling contact of the balls 10 with the sides 11 and 12 of the grooves 5 and 6. The internally beveled surface 14 of the nose ring 7 engages the correspondingly beveled outer end portion of the collet 3 and thus such leftward movement of the nose ring 7 will force the collet 3 into the tapered bore 2 of the chuck body 1 for contraction about the shank of the tool (not shown) therewithin.

Adjacent the internally beveled surface 14 of the nose ring there is provided an inturned rib 15 which is beveled on opposite sides and extends into a peripheral groove 16 in the collet. Thus, when the nosepiece 4 is turned to retract it toward the right, the balls 10 engaged between the sides 17 and 18 of the grooves 5 and 6 will urge the nose ring 7 toward the right, whereupon the right beveled face of rib 15 will engage the shoulder 19 at the right of groove 16 to positively withdraw the collet 3 from the chuck body 1 when there is a tool shank in the collet 3.

When the nosepiece assembly 4-7 is completely unscrewed from the chuck body 1 it is a simple matter to pull out the collet 3 by reason of the cam action of the right beveled surface of rib 15 on shoulder 19, such cam action contracting the collet 3 for ready removal. Similarly, when another collet 3 is inserted, the beveled end 20 thereof cooperating with the left beveled surface of the rib 15 of the nose ring 7 will similarly contract the collet 3 so that the shoulder 19 will snap outwardly behind the rib 15 as shown in FIGS. 1 and 3.

As best shown in the much enlarged FIG. 4, the grooves 5 and 6 in the nosepiece 4 and nose ring 7, respectively, are of such width and depth in relation to the diameter of the balls 10 as to provide for slight radial and axial looseness between the nose ring 7 and the nosepiece 4 thereby to accommodate any eccentricity of the nosepiece 4 with respect to the tapered bore 2 in the chuck body 1. Thus, if there is no such eccentricity, the balls 10 will be in the full line position shown in FIG. 4 and when the nosepiece 4 is turned in opposite directions, compressive forces acting through the diameters of the balls will be transmitted from the nosepiece 4 to the nose ring 7 along the lines 21 and 23. However, if there is slight eccentricity between the nosepiece 4 and the tapered bore 2, the balls 10 may shift to the dot-dash line positions as shown in FIG. 4, but in either case the forces will still be transmitted through the diameters of the balls 10 along the lines 24 and 25, or 26 and 27, without causing the nose ring 7 to be forced eccentrically. This eliminates tendency of forcing the end portion of collet 3 off center. It has been found that with a construction as shown in FIGS. 1 to 4, great accuracy is achieved within .0003" total indicator reading at a distance of 4" from the end of the collet 3 and, moreover, the gripping force with prescribed torque applied on the nosepiece 4 is about 50% greater than achieved with, for example, the construction disclosed in the Benjamin Patent 3,035,845.

Referring now to FIG. 5, the nosepiece 30 and nose ring 31 have a slip fit connection and define therebetween an annular raceway 32 of circular cross-section in which are disposed a full complement of balls 34, said balls being inserted into the raceway through the radial passage 35 in the nosepiece 30 which is closed by a self-locking screw plug 36. In this case, since the nose ring 31 and collet 37 have planar interengaged faces 38 and 39 eccentricity of the nosepiece 30 and nose ring 31 with respect to the tapered bore 2 of the chuck body 1 is not transmitted to the collet 37. In this case, as in FIGS. 1 to 4, the nose ring 30 is provided with an inturned rib 40 which extends radially into the peripheral groove 41 of the collet, whereby when the nosepiece 30 is unscrewed from the chuck body 1, the face 42 of the rib 40 engages the shoulder 43 of the collet 37 to positively withdraw the latter from the chuck body 1. The beveled face 45 of the rib 40 of the nose ring 31 acts as a cam on the corner 46 of the collet 37 when the latter is inserted into the nose ring 31.

Referring now to FIGS. 6 and 7, the chuck therein shown is of the self-releasing type (see, for example, the Benjamin Patent 2,228,685) in which the chuck body 50 is formed with axially spaced apart cam surfaces 51 of relatively steep angle (25°, for example) engaged by correspondingly spaced and tapered faces 52 of the collet 53. In this case, the nosepiece 54 and nose ring 56 are connected together for relative rotation by a full complement of balls 57 loaded into the annular raceway 58 defined by internal and external grooves formed in the nosepiece 54 and nose ring 56, respectively. The radial passage 59 through which the balls 57 are loaded into the raceway 58 is closed by the self-locking screw plug 60. Preferably, flanks of said grooves are frusto-conical as shown so as to eliminate deformation at the corners. Also, the bottom of the grooves are rounded and of a radius substantially equal to the radius of the balls 57 as shown to provide a slight amount of radial looseness between the balls 57 and the raceway 58 so that any eccentricity of the nosepiece 54 with respect to the tapered cam surfaces 51 will not cause the collet 53 to be forced eccentrically at its outer end portion.

FIG. 8 is an enlarged radial cross-section view of a modified form of nosepiece assembly in which the grooves 61 and 62 in the nosepiece 63 and nose ring 64 respectively are fashioned so that the row of balls 65 are directly axially compressed between the radially overlapping opposite sides 67 and 68 of said grooves 61 and 62 during axial inward movement of the nosepiece. The other sides of the grooves 61, 62 radially overlap a portion of the balls for retaining the nosepiece 63 and nose ring 64 axially together during axial outward movement of the nosepiece. Furthermore, the outer end of the collet 69 has a convex rounded surface 70 (a portion of a torus), and the internally beveled end of the nose ring 64 likewise has a convex rounded surface 71 to establish a uniform line contact to avoid tendency of eccentric loading on the outer end of the collets 69. The radial clearance 72 between the nose ring 64 and the nosepiece 63 allows centering of the nose ring 64 by the collet 69, whereby eccentricity of the nosepiece 63 with respect to the tapered bore 2 of the chuck body 1 will not affect the concentricity of the outer end portion of said collet 69.

The collet 69 has a peripheral groove 74 (corresponding to groove 16 of collet 3) which cooperates with inturned rib 73 of collet 69 in the same way as rib 15 of nose ring 7 cooperates with groove 16.

Accordingly, it can be seen that in the several embodiments of the invention herein disclosed the nosepieces and nose rings thereof are retained or axially keyed together by balls through which axial forces are transmitted from the nosepieces to the nose rings. These connections also function as ball bearings so that rotation of the nosepieces (the outer races) does not cause rotation of the nose rings (the inner races). Thus there are virtually no twisting forces applied by the nose rings on the collets engaged thereby. Moreover, extreme accuracy is accomplished in the gripping of tool shanks or the like concentrically of the chuck bodies.

Other modes of applying the principle of the invention may be employed, change being made as regards the details described, provided the features stated in any of the following claims, or the equivalent of such, be employed.

We therefore particularly point out and distinctly claim as our invention:

1. A chuck comprising a body having a cam surface; a collet arranged to be contracted upon axial movement against said surface; a nosepiece having threaded engagement with said body; and a nose ring having a rotatable, but axially fixed, connection with said nosepiece and being engageable with said collet to move the latter axially upon turning of said nosepiece in one direction; said connection comprising bearing elements in an annular raceway defined by radially opposed grooves in said nosepiece and nose ring effective to retain them axially together and to permit turning of said nosepiece with respect to said nose ring; said nose ring and collet having radially overlapped portions effective to move the latter axially away from said cam surface upon turning of said nosepiece in the opposite direction.

2. A chuck comprising a body having a cam surface; a collet arranged to be contracted upon axial movement against said surface; a nosepiece having threaded engagement with said body; and a nose ring having a rotatable, but axially fixed, connection with said nosepiece and being engageable with said collet to move the latter axially upon turning of said nosepiece in one direction; said connection comprising bearing elements in an annular raceway defined by radially opposed grooves in said nosepiece and nose ring effective to retain them axially together and to permit turning of said nosepiece with respect to said nose ring; said nose ring and collet having radially overlapped portions effective to move the latter axially away from said cam surface upon turning of said nosepiece in the opposite direction; a face of one of said portions being tapered to constitute cam means to facilitate removal of said collet from within said nose ring.

3. A chuck comprising a body having a cam surface; a collet arranged to be contracted upon axial movement against said surface; a nosepiece having threaded engagement with said body; and a nose ring having a rotatable, but axially fixed, connection with said nosepiece and being engageable with said collet to move the latter axially upon turning of said nosepiece in one direction; said connection comprising balls in an annular raceway defined by radially opposed grooves in said nosepiece and nose ring effective to retain them axially together and to permit turning of said nosepiece with respect to said nose ring; said nose ring and collet having interengageable radially overlapped faces to move said collet axially in opposite directions, said faces constituting cam means to facilitate insertion and withdrawal of said collet into and from said nose ring.

4. A chuck comprising a body having a cam surface; a collet arranged to be contracted upon axial movement against said cam surface; a nosepiece having threaded engagement with said body; and a nose ring having a radial clearance with said nosepiece and a rotatable, but axially fixed, connection with said nosepiece; said nose ring having a beveled surface engageable with a correspondingly beveled surface on said collet to move the latter axially upon turning of said nosepiece in one direction; said connection comprising balls in an annular raceway defined by radially opposed grooves in said nosepiece and nose ring effective to retain said nosepiece and nose ring axially together and to permit turning of said nosepiece with respect to said nose ring; the width and depth of said grooves in relation to the diameter of said balls being such as to provide for slight radial and axial looseness of said balls within said annular raceway which together with such radial clearance between said nosepiece and nose ring permit centering of said nose ring by said collet, whereby eccentricity of said nosepiece with respect to said chuck body will not affect the concentricity of said collet within said chuck body, the sides of said grooves being frusto-conical to such an extent that forces are transmitted from said nosepiece to said nose ring through the diameters of said balls.

5. The chuck of claim 4 wherein said grooves have a rounded bottom of radius substantially equal to the radius of said balls.

6. The chuck of claim 4 wherein the bottoms of said grooves are substantially flat.

7. A chuck comprising a body having a cam surface; a collet arranged to be contracted upon axial movement against said cam surface; a nosepiece having threaded engagement with said body; and a nose ring having a rotatable, but axially fixed, connection with said nosepiece, said nose ring being engageable with said collet to move the latter axially upon turning of said nosepiece in one direction; said connection comprising balls in an annular raceway defined by radially opposed grooves in said nosepiece and nose ring effective to retain said nosepiece and nose ring axially together and to permit turning of said nosepiece with respect to said nose ring; said nose ring and collet having a radial clearance therebetween and having radially extending planar faces which overlap each other to accommodate turning of said nosepiece about an axis eccentric with respect to the axis of said body and collet; said nose ring having a relatively close fit in said nosepiece to exclude foreign matter from said raceway.

8. A chuck comprising a body having a cam surface; a collet arranged to be contracted upon axial movement against said cam surface; a nosepiece having threaded engagement with said body; and a nose ring having a rotatable, but axially fixed, connection with said nosepiece; said connection comprising bearing elements in an annular raceway defined by radially opposed grooves in said nosepiece and nose ring effective to retain said nosepiece and nose ring axially together and to permit turning of said nosepiece with respect to said nose ring; said nose ring and collet having interengageable radially overlapped faces to move said collet against said cam surface upon turning of said nosepiece in one direction; at least one of said radially overlapped faces being inclined and convexly rounded for line contact with the other of said faces to preclude eccentric loading of said collet by said nose ring 9. The chuck of claim 8 wherein both of said interengageable radially overlapping faces on said nose ring and collet are inclined and convexly rounded for line contact with each other to preclude such eccentric loading of said collet by said nose ring as aforesaid.

10. A chuck comprising a body having a cam surface; a collet arranged to be contracted upon axial movement against said surface; a nosepiece having threaded engagement with said body; and a nose ring having a rotatable, but axially fixed connection with said nosepiece and being engageable with said collet to move the latter axially upon turning of said nosepiece in one direction; said connection comprising balls in an annular raceway defined by radially opposed grooves in said nosepiece and nose ring effective to retain them axially together and to permit turning of said nosepiece with respect to said nose ring; the axial outer side of said groove in said nosepiece and axial inner side of said groove in said nose ring being radially overlapped to transmit force substantially axially through said balls from said axial outer side of said groove in said nosepiece to said axial inner side of said groove in said nose ring during axial inward movement of said nosepiece; the axial inner side of said groove in said nosepiece and axial outer side of said groove in said nose ring radially overlapping a portion of said balls for retaining said nosepiece and nose ring axially together during axial outward movement of said nosepiece.

References Cited

UNITED STATES PATENTS

| | | | |
|---|---|---|---|
| 3,332,693 | 7/1967 | Armstrong | 279—51 |
| 1,398,341 | 11/1921 | Pfunder | 279—59 |
| 1,880,521 | 10/1932 | Stowell | 279—56 |
| 2,358,299 | 9/1944 | Benjamin et al. | 279—49 |
| 2,885,210 | 5/1959 | Sima | 279—49 |
| 3,035,845 | 5/1962 | Benjamin | 279—47 |

FOREIGN PATENTS 560,589   4/1957   Italy.

ROBERT C. RIORDON, Primary Examiner.

E. A. CARPENTER, Assistant Examiner.